Feb. 13, 1962  N. W. DAKE  3,021,115
HAND RAILING SYSTEM
Filed July 3, 1958
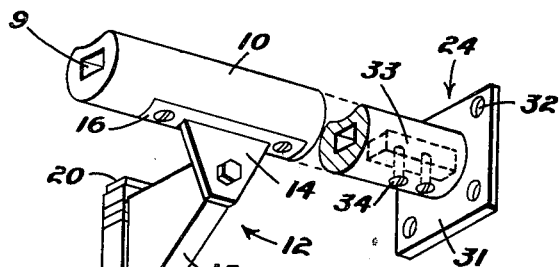
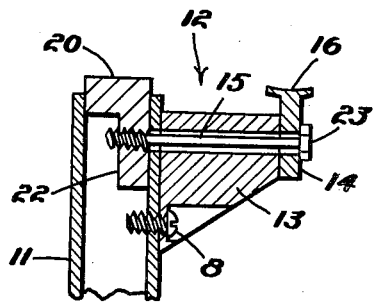
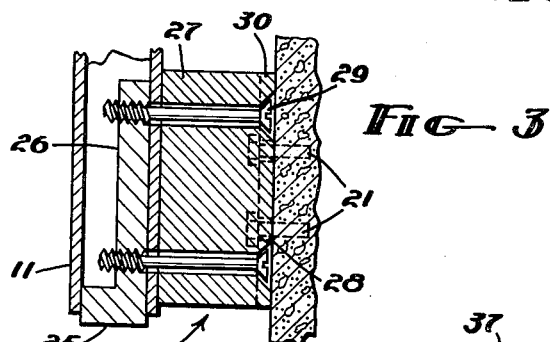
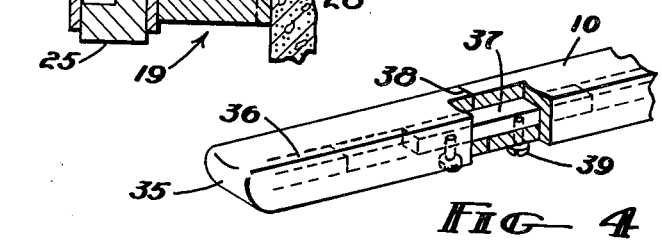
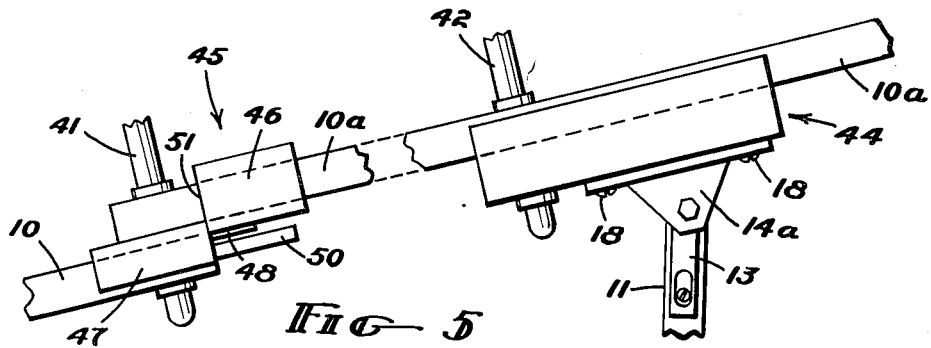
INVENTOR.
NORMAN W. DAKE
BY H. Vincent Harsha
ATTORNEY

United States Patent Office 3,021,115
Patented Feb. 13, 1962

3,021,115
HAND RAILING SYSTEM
Norman W. Dake, 2334 Blake Blvd. SE.,
Cedar Rapids, Iowa
Filed July 3, 1958, Ser. No. 746,534
3 Claims. (Cl. 256—65)

This invention relates generally to handrail systems and more particularly to a railing system and method of fabrication thereof wherein custom-made features are realized, but wherein procedures are considerably and uniquely simplified.

The railing system to be described utilizes components which functionally combine contemporary styling with structural simplicity and rigidity into an improved railing concept which may be installed with a minimum investment of time and expense, and which, by its structure, permits rapid and varied field installations to be made from a minimum of detailed field measurements.

Numerous railing systems have been developed which provide for customized field installations. Generally the known systems involve quite complex installation procedures which are beyond the scope of the unskilled worker, and which require numerous and involved installation procedures due to complex structure necessary to arrive at a railing installation of pleasing design and structural rigidity. Mounting brackets of special and varied design are often incorporated for particular installation problems, such as, for example, conformity to various railing pitches, bends, curves, etc. It is an object, therefore, of the present invention to provide a hand rail system which combines components of structural simplicity by which a railing installation may be adapted to widely varying installation sites using a minimum of components.

A further object of this invention is the provision for a railing system and fabrication method therefor wherein custom installation may be made expeditiously from a minimum of components which by their design are adaptable to allow for widely varying handrail contours wherein changes in pitch and general balustrade contour do not necessitate special custom brackets and posts to meet particular installation specifications.

Still a further object of this invention is the provision of a railing system, the handrail bracket mounting means of which enables handrail mounting to be made on posts or to be wall suspended using but a single bracket type.

The invention is featured in combining the standard cap rail and mating channel functions into a modern designed tubular handrail section, which permits the use of functional fasteners such as bolts and screws to greatly simplify the installation procedure over that necessary to erect comparable railing styles. The special sectional design of the handrail of this railing system permits bends, spirals, etc., to be made easily with the rail acting as a solid bar. Bends as well as splices may be made by the insertion of a common stock bar at the splice point or the bend area.

These and other features, objects, and advantages of the invention will become apparent upon reading the following description in conjunction with the accompanying figures in which:

FIGURE 1 is a structural view of a portion of the railing system showing the offset bracket mounting means and a wall termination for a handrail and a method of post anchoring;

FIGURE 2 is a sectional detail of the mounting means employed between post and rail bracket;

FIGURE 3 is a sectional view along line 3—3 of FIGURE 1;

FIGURE 4 is an isometric view of a section of handrail showing free termination means and splicing details; and FIGURE 5 is a side view of means by which precision handrail splices may be made in the field during installation.

With reference to FIGURE 1, a single handrail 10 is shown attached to the upper portion of a mounting post 11. It is to be realized, of course, that in actual construction a plurality of handrails 10 might be incorporated into the finished installation. The rail 10 is formed from a continuous extruded hollow member and might be made from, for example, aluminum. No limitation is made on the various styling which may be designed into the hollow railing material. The particular rail illustrated is seen to be formed with a concave top surface and convex underside. The extruded rail stock is formed with a generally rectangular center opening 9 into which, for the purpose of bending and splicing to be later described in detail, an insert section of metallic bar may be inserted to effectively fill the tubular rail at the affected points along the run of handrail. FIGURE 1 further shows a bracket mounting means generally designated by reference numeral 12 by which the rail may be offset mounted in relation to the post 11. This mounting means, as will be described later, permits flexibility in rail suspensions, the same mounting bracket 12 being adaptable for post mounting or wall suspension as desired.

Details of the bracket 12 and its relationship with the post 11 are shown in FIGURE 2. Each mounting bracket 12 is formed from a tapered spacing member 13 and an end member 14 which is rotatably mounted on the end of the spacer 13 to permit adaptation of the bracket for various pitches to be encountered for runs of railing. End members 14 of the brackets 12 are terminated with transverse cross members 16 which may be formed with a contour compatible with the undersurface of the handrail 10. Cross members 16 may then be secured to the handrail 10 by functional screw fasteners, as shown in FIGURE 1. As shown in section in FIGURE 2, the spacing member 13 is formed with a through-hole 15 through which a standard bolt 23 may be inserted to secure the end member 14 of the bracket to the spacer member 13. A second fastener 8 might then prevent rotation of the spacer 13 with respect to the post 11.

For the post mounting illustrated in FIGURES 1 and 2, the post 11, which is formed from hollow stock, is fitted with a top terminating cap member 20 which may be inserted in the end of each post 11. It is noted, with reference to FIGURE 2, that the cap member 20 is formed with a downwardly extending tab-like portion 22 which is drilled and threaded for receiving the bracket mounting bolt 23, the post 11 having been drilled with an access hole through which the bolt 23 may pass to secure in member 22. From the construction of the brackets 12 it is seen that for the purpose of wall suspension mounting of rails 10, the same bracket may be readily employed, in which case a flat wall plate may terminate the bracket 12 or, alternatively, the spacer member 13 of the bracket may be affixed directly to the wall surface. Flexibility in installation is thus realized by the offset mounting bracket means. After positioning the bracket end pieces 14 with respect to the spacing members 13 to conform to the pitch of the railing run at the mounting point, the entire mounting is rigidly secured in position by tightening the mounting bolt 23 in its post anchoring means, and insertion of fastener 8.

The bottom of the posts 11 of the railing system may be secured in concrete if desired or secured flush to a step or floor surface by means of a flange base member (not illustrated). The flange base member would be similar in function to the wall flange member 24 shown in FIGURE 1, the details of which will be further described. For the purpose of a flange base mount for the railing posts 11, a flange member would be provided with an upwardly extending insert member at right angles thereto which would fit into the hollow center of the post 11 and be secured therein by means of screws, for example.

FIGURES 1 and 3 illustrate a sidemount flange post mounting means by which the base of the posts 11 may be secured to a wall as for an inside railing of a staircase run. The base mounting detail is shown in FIGURE 3 and is similar in function to rail bracket mounting in FIGURE 2. A base flange member generally designated by reference numeral 19 is formed with a spacing member 27 terminated by a transverse flange or plate portion 30. Spacing member 27 is formed with through-holes which receive mounting bolts 29. Mounting bolts 29 are threadedly received in an anchor plate member 26 which is formed as an extended tab-like portion of a bottom post cap member 25. Plate member 26 is drilled and threaded to receive the mounting bolts 29 such that the cap member 25 may be inserted in the hollow post 11 and the entire sidemount flange assembly rigidly affixed to the post 11 by tightening the mounting bolts 29. The post 11 is drilled to provide access through-holes for the mounting bolts 29. The flange member 30 of the sidemount flange assembly 19 is provided with through-holes 28 through which fasteners 21 may be inserted for the purpose of securing the flange assembly to the wall or other adjacent upright surface.

The hollow tubular design of the handrail of this system permits a range of flexibility in the terminations of the handrails. Both free terminations and wall terminations may be expeditiously made. FIGURE 1 illustrates a wall termination of the handrail 10 made by means of a wall terminal member generally designated by reference numeral 24. A plate member 31 is adapted by means of mounting holes 32 for attachment to the wall or other vertical surface. Plate member 31 has a bar member 33 extending from its surface, which bar member is adapted to conform with the rectangular cross section of the hollow center of the railing 10. Wall terminal 24 may then be inserted into rail 10 so that the rail wall fits flush with the plate member 31. The wall terminal member may then be secured to the rail by means of machine bolts or self-tapping screws 34 as illustrated in FIGURE 1.

FIGURE 4 illustrates a section of handrail 10, one end 35 of which is modified to function as a free end termination. A section of bar 36 is inserted into rail 10 and the end filled as by welding and formed smooth. A splice between lengths of handrail 10 is effected by the insertion of a section of splice bar 37 to extend across the splice 38. The splice is completed by means of screws 39 which are passed through the two sections of rail 10 into the splice bar 37. A structurally solid splice is thus attained, without the necessity of unsightly protruding overlays. The same splice bar insert member may also be effectively employed when a section of handrail 10 is to be bent or spiraled to fit a particular installation. Lengths of insert bar may be readily inserted into the hollow handrail members and the handrail may then be formed with the rail acting as a solid bar. Thus, various rail conformations may be realized without deformation of the cross sectional configuration of the handrail.

The railing system of this invention is particularly adaptable for ease in field installation and permits such installations to be made with a minimum of complication and without the necessity of tedious and extremely careful measurements as are necessary in the case of custom railing systems which are factory fabricated according to an exacting set of careful field measurements for each particular installation. The components of the present railing system are seen to be few in number and adaptable without special modifications to cope with widely varying installation schemes. The particular handrail and mounting bracket design permits exacting splices to be made during installation from stock components which may be mass produced. One person can easily adapt the stock components to conform to a particular field installation and may make exacting and accurate splices during installation.

FIGURE 5 illustrates means whereby sections of handrail 10 may be spliced to preceding sections secured in place in the railing system. Standard sections of handrail 10 would be supplied the installer with one end having a section of splice bar 50 inserted and secured therein. Two tools would be provided the installer—a spacer and saw guide tool generally designated by reference numeral 45, and a spacer and bracket adapter tool generally designated by reference numeral 44. As shown in FIGURE 5, a section of an installed rail member 10 is clamped to a new railing section 10a by means of spacer tool 45. Tool 45 is seen to be of a back-to-back channel-like construction wherein a first downwardly extending U-shaped portion 47 fits over the top of installed rail 10 and a second U-shaped portion 46 extends upwardly and oppositely to receive the end of a section of new rail 10a. By means of a C-clamp 41, tool 45 may be rigidly affixed in place, thus securing railing sections 10 and 10a one over the other. An extending portion 48 on the underside of the top member 46 of tool 45 is provided to act as a stop member such that the tool 45 is aligned along the rail axis with the edge 51 of member 46 of the tool being substantially flush with the end of the installed rail section 10. Edge 51 then may function as a saw guide by which an accurate cut may be made through new rail section 10a to effect a perfect matching splice with the end of installed rail section 10. The splicing operation is further simplified by means of a spacer-bracket tool 44 which is affixed to the new section of rail 10a by means of a second C-clamp 42. Spacer tool 44 is adapted to be readily affixed to any installed post rail bracket member 14a by means of screws 18. Spacer 44 is adapted to receive the new section of rail 10a and hold it in place with respect to an installed post 11 such that the correct pitch of the railing run is maintained, while spacing the new rail section 10a upwardly from its finalized position by substantially the thickness of the rail. Thus a perfectly aligned but paralleled separation is maintained between new rail 10a and old rail 10 to which it is to be spliced. It is seen that this splicing method enables a perfect splice to be made to a section of rail 10 already mounted in place. The offset clamping means places the new rail section 10a in position such that the inserted splice bar 50 extending from the installed rail section 10 does not interfere with the operation. The saw guide then insures the proper cut to be made such that a perfect splice is made to provide accurate continuity in the run of railing. The spacer and saw-guide tools 44 and 45 are seen to be of a construction such that they may be made inexpensively from stock material, and in fact could be considered as expendable items which would be furnished the installer and might be discarded after installation is completed.

The procedure for installation of the railing system herein described is seen to be simplified by the design of the components. Only simple measurements such as length of run and pitch need be made. The components permit the use throughout of functional fasteners of a common nature such as machine screws, bolts, and self-tapping metal screws. It is further seen that the handrail conformation and the offset bracket mounting means therefore permit minimizing the number of components necessary to erect a functionally rigid and extremely adaptable railing system. The railing system is equally adaptable to offset mounting with posts or to offset wall mounting with a standard number of stock components.

being used in various combinations to effect the particular installation specification. By its structural simplification without sacrifice of functionalism, the railing system permits customized handrail installations to be made with a substantial reduction in cost by persons possessing no specialized skill.

Although this invention has been described with respect to particular embodiments thereof, it is not to be so limited, as changes and modifications may be made therein which are within the full intended scope as defined by the appended claims.

What is claimed is:

1. A railing system comprising a plurality of hollow handrail members each having a rectangular central opening extending longitudinally therethrough, each said handrail having attached thereto and being supported by a plurality of offset bracket means each comprising a spacer member extending transversely from the underside of said handrail, a transverse end terminating member rotatably positionable with respect to and mounted on said spacer member by a bracket securing bolt, said end member formed with a surface adapted to conform to the undersurface of said handrail and secured thereto by fastening means, a plurality of space separated hollow baluster posts, and means for securing each said post in a fixed position to define a balustrade contour, each said post provided with access holes through which said bracket securing bolts may be received, each post closed top and bottom with cap terminating members, said terminating members adapted to have a portion thereof received within the hollow center opening in said post and including an extended tab-like portion which extends longitudinally within said post and adjacent at least the inside surface of the bracket mounting side of said post, and said tab-like portion including means to threadedly receive and secure at least one said bracket-securing bolt, whereby certain ones of said handrails may be secured to said posts in an offset and preselected angular relationship with respect thereto.

2. A railing system as described in claim 1 including means for free termination of one end of at least one of said handrails comprising splice bar means of rectangular shape inserted in the free end of said handrail and substantially flush with the free end thereof, and means to secure said bar means therein.

3. A railing system as described in claim 1 including a secured end termination of at least one of said handrails comprising a flange plate adapted for securement to a mounting surface, said flange plate having a rectangular member extended from the surface thereof and adapted to be received within the rectangular opening extending longitudinally through said handrail, said bar inserted within said handrail with said flange plate flush to the end of said handrail, and means securing said insert bar within said handrail.

References Cited in the file of this patent

UNITED STATES PATENTS

| | | |
|---|---|---|
| 163,996 | Hardy | June 1, 1875 |
| 1,526,638 | Knight | Feb. 17, 1925 |
| 2,766,372 | Albris | Oct. 9, 1956 |
| 2,807,834 | Blum | Oct. 1, 1957 |
| 2,886,278 | Opie | May 12, 1959 |